(12) United States Patent
Takeuchi et al.

(10) Patent No.: US 7,377,853 B2
(45) Date of Patent: May 27, 2008

(54) TORQUE FLUCTUATION ABSORBING DEVICE

(75) Inventors: Makoto Takeuchi, Obu (JP); Masaru Ebata, Chita (JP); Satoshi Nakagaito, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 176 days.

(21) Appl. No.: 10/967,264

(22) Filed: Oct. 19, 2004

(65) Prior Publication Data

US 2005/0096138 A1    May 5, 2005

(30) Foreign Application Priority Data

Oct. 31, 2003   (JP)   ............................. 2003-371469

(51) Int. Cl.
    *F16D 7/02*   (2006.01)
(52) U.S. Cl. ..................................... 464/46; 464/68.41
(58) Field of Classification Search .................. 464/46, 464/68.41, 43, 45, 47, 48; 267/161
    See application file for complete search history.

(56) References Cited

U.S. PATENT DOCUMENTS

| | | | |
|---|---|---|---|
| 2,100,464 A * | 11/1937 | Almen et al. ............ | 267/161 X |
| 2,535,842 A * | 12/1950 | Criley ....................... | 464/46 X |
| 2,690,243 A * | 9/1954 | Sherill, Jr. et al. ......... | 464/48 X |
| 3,323,328 A * | 6/1967 | Montgomery ................ | 464/46 |
| 4,222,476 A | 9/1980 | LeBrise | |
| 4,842,116 A | 6/1989 | Fukushima | |
| 6,026,710 A | 2/2000 | Orlamunder et al. | |
| 6,582,312 B2 * | 6/2003 | Suzuki et al. ................ | 464/46 |
| 2003/0087704 A1 | 5/2003 | Takeuchi et al. | |

FOREIGN PATENT DOCUMENTS

| | | |
|---|---|---|
| JP | 2003-194095 | 7/2003 |
| WO | WO 03/031840 A1 | 4/2003 |

OTHER PUBLICATIONS

European Patent Office Search Report dated Feb. 1, 2005.

\* cited by examiner

*Primary Examiner*—Greg Binda
(74) *Attorney, Agent, or Firm*—Buchanan Ingersoll & Rooney PC

(57) ABSTRACT

A torque fluctuation absorbing device includes a damping mechanism connected with an input shaft of a transmission. The damping mechanism has an approximately annular-shaped frictional member, which is fixed to both surfaces of a disc disposed at outer peripheral portion. The torque fluctuation absorbing device further includes a flywheel for transmitting driving force from a driving power source, a first plate rotated with the flywheel and abutting on a first surface of the frictional member, a second plate abutting on a second surface of the frictional member, a coned disk spring for biasing the second plate against the frictional member, a supporting member rotated with the first plate and supporting the coned disk spring, and a plurality of fixation members for fixing the first plate with the supporting member. The first plate includes a reinforcement portion which reinforces rigidity of the first plate at an inner circumference portion located radially inwardly relative to the frictional member.

16 Claims, 9 Drawing Sheets

FIG. 8A  Conventional Work
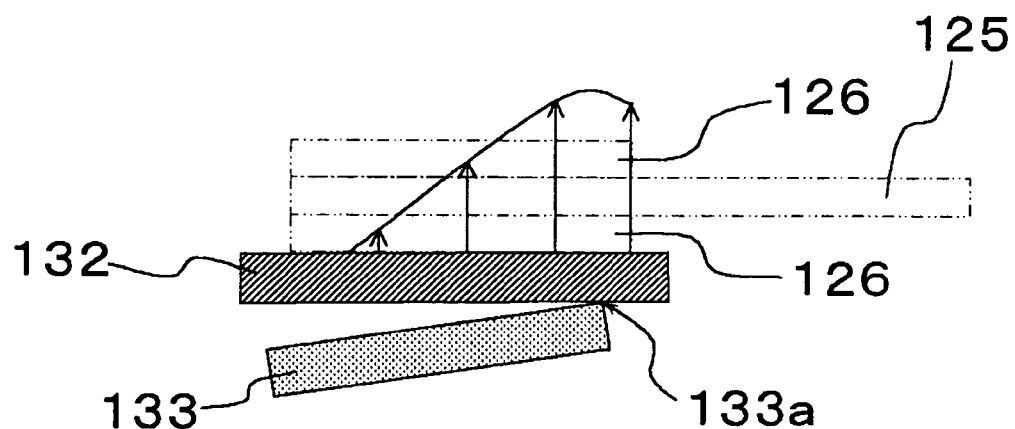
FIG. 8B  Conventional Work
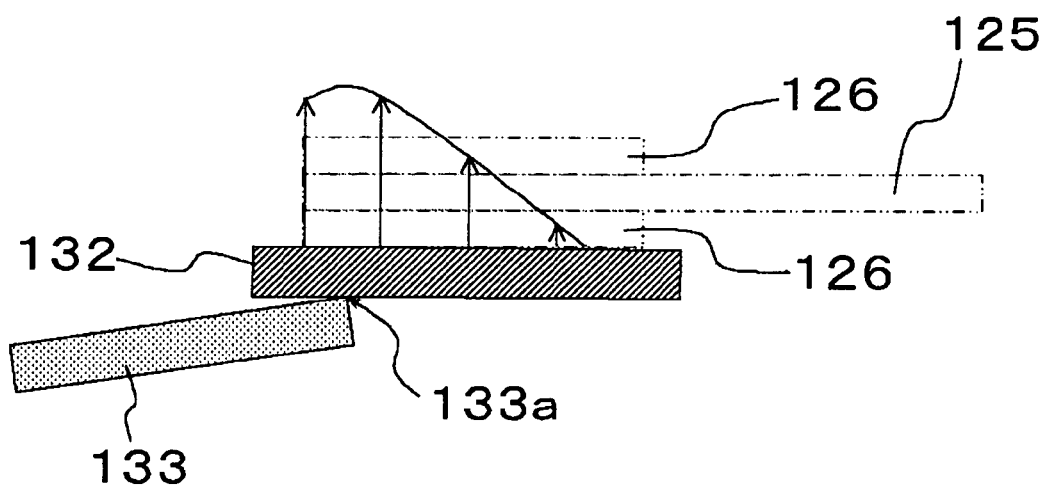

Conventional Work

TORQUE FLUCTUATION ABSORBING DEVICE

CROSS REFERENCE TO RELATED APPLICATIONS

This application is based on and claims priority under 35 U.S.C. § 119 with respect to Japanese Patent Application 2003-371469, filed on Oct. 31, 2003, the entire content of which is incorporated herein by reference.

FIELD OF THE INVENTION

This invention generally relates to a torque fluctuation absorbing device which is disposed between a driving power source and transmission and can absorb torque fluctuation generated therebetween. More particularly, this invention pertains to a torque fluctuation absorbing device wherein friction is constant and frictional torque is stable.

BACKGROUND

Torque fluctuation absorbing devices, which can absorb torque fluctuation generated between a driving power source (e.g., an internal combustion engine or an electric motor) and transmission, are widely known. Conventional torque fluctuation absorbing devices are provided with a damping mechanism, which can absorb fluctuation of driving torque transmitted to a flywheel from the driving power source, and a limiter portion, which limits torque to be transmitted from the flywheel to a transmission input shaft when fluctuating torque between the damping mechanism and the flywheel reaches a predetermined value, i.e., a limit torque value. The flywheel is connected to the driving power source, such as a crankshaft of the internal combustion engine. The damping mechanism is connected to the transmission input shaft. The damping mechanism includes frictional members that are respectively fixed to both sides of a disc at an outer circumferential portion. At the limiter portion, the frictional members of the damping mechanism are frictionally engaged with the flywheel in a direct manner or in an indirect manner via a frictional plate.

The limit torque value, at which the frictional members at the limiter portion start slipping, varies with the ages in response to the number of the operations of the limiter portion. Therefore, when the limit torque value widely increases, an excessive torque may be inputted to the transmission. As a result, the transmission may be damaged. On the other hand, when the limit torque value widely decreases, the frictional members may start slipping with a torque smaller than normal transmitting torque. In this case, torque may not be transmitted to the transmission.

Frictional powder of the frictional members, which composes of a torque limiter, seems to be one of the factors causing the above problem. In light of the foregoing, JP2003-194095A2 discloses a torque fluctuation absorbing device which forms slits communicating with the frictional member from an inner circumference portion to an outer circumference portion so as to discharge generated frictional powder into an external ambient environment by centrifugal force. The limit torque value can be stable by disposition of slits.

However, in the conventional torque fluctuation absorbing devices, frictional members, which are disposed at an outer circumference of the damping mechanism, are sandwiched by two plates. One plate is biased by a coned disk spring and the other plate is fixed to members, which rotate with the flywheel via rivets or other fixing means. This will raise the following problems.

Even when a coned disk spring 133 abuts on the opposite surface in a region wherein a second plate 132 provided at the coned disk spring 133 side and a frictional member 126 abut, if the abutting portion between the second plate 132 and the coned disk spring is deviated to the inner peripheral side (see FIG. 8A), or to the outer peripheral side (see FIG. 8B), a surface pressure distribution of the frictional surface pressure is not uniform and frictional torque is not stable. In the worst case, the second plate 132 floats up from the frictional member 126 at a portion of low surface pressure.

Within a region wherein a first plate 131, which rotates with the flywheel and the frictional member 126 abut, the bending amount at riveting area by rivets 134 is different from the area away from the riveting area in the first plate 131. This will cause the first plate 131 to be in wave shape in circumferential direction. As a result it, there is a problem wherein a high portion and a low portion are formed on an outer surface of the first plate 131. Thus the surface pressure distribution of the frictional surface pressure becomes inconstant. Therefore stability of frictional torque falls.

A need exists for providing an improved torque fluctuation absorbing device wherein a surface of a plate is flat and smooth relative to a surface of the frictional member and the surface pressure distribution is constant and frictional torque is stable.

SUMMARY OF THE INVENTION

A torque fluctuation absorbing device includes a damping mechanism connected with an input shaft of a transmission. The damping mechanism has an approximately annular-shaped frictional member, which is fixed to both surfaces of a disc disposed at outer peripheral portion. The torque fluctuation absorbing device further includes a flywheel for transmitting driving force from a driving power source, a first plate rotated with the flywheel and abutting on a first surface of the frictional member, a second plate abutting on a second surface of the frictional member, a coned disk spring for biasing the second plate against the frictional member, a supporting member rotated with the first plate and supporting the coned disk spring, and a plurality of fixation members for fixing the first plate with the supporting member. The first plate includes a reinforcement portion which reinforces rigidity of the first plate at an inner circumference portion located radially inwardly relative to the frictional member.

BRIEF DESCRIPTION OF THE DRAWINGS

The foregoing and additional features and characteristics of the present invention will become more apparent from the following detailed description considered with reference to the accompanying drawings, wherein:

FIG. 8 is a partial sectional view from the center shaft illustrating a conventional torque fluctuation absorbing device.

DETAILED DESCRIPTION

Figure 1:
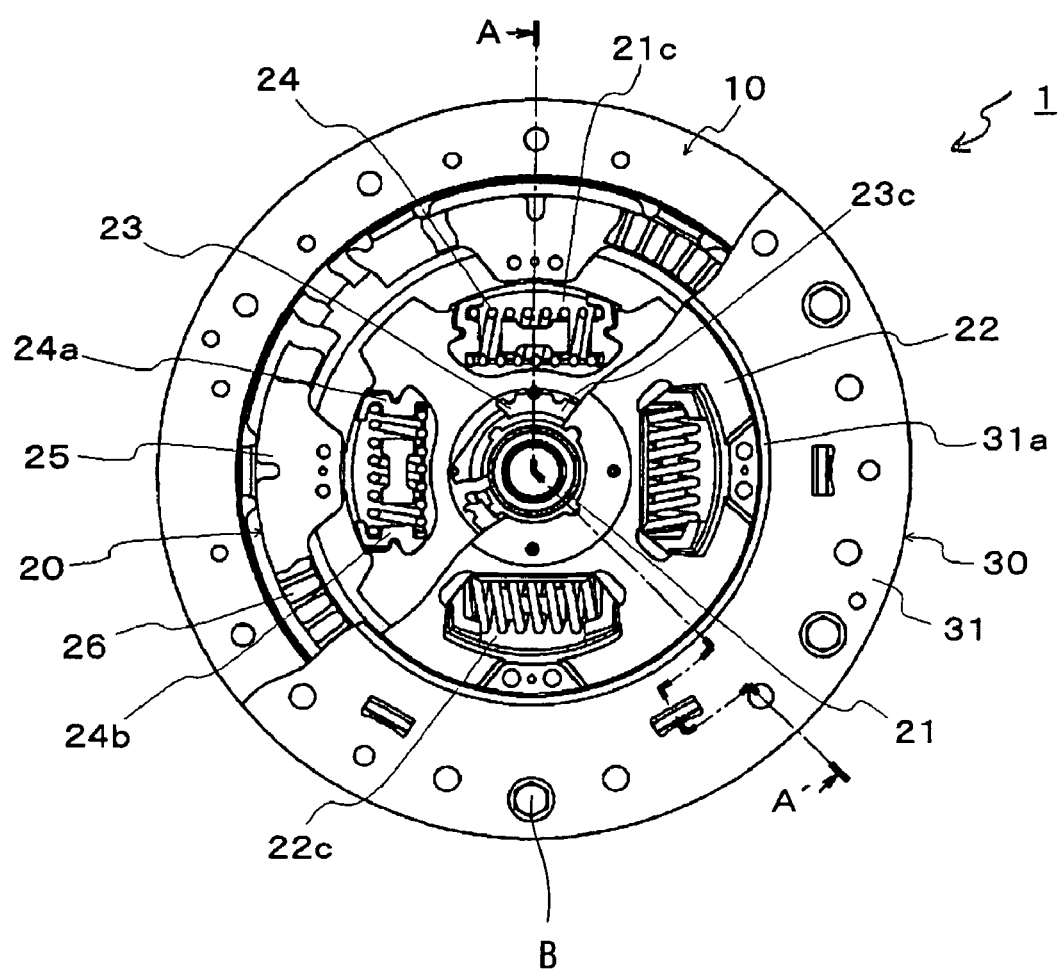
FIG. 1 is a plane view with a part cutaway illustrating a torque fluctuation absorbing device according to a first embodiment of the present invention.
Figure 2:
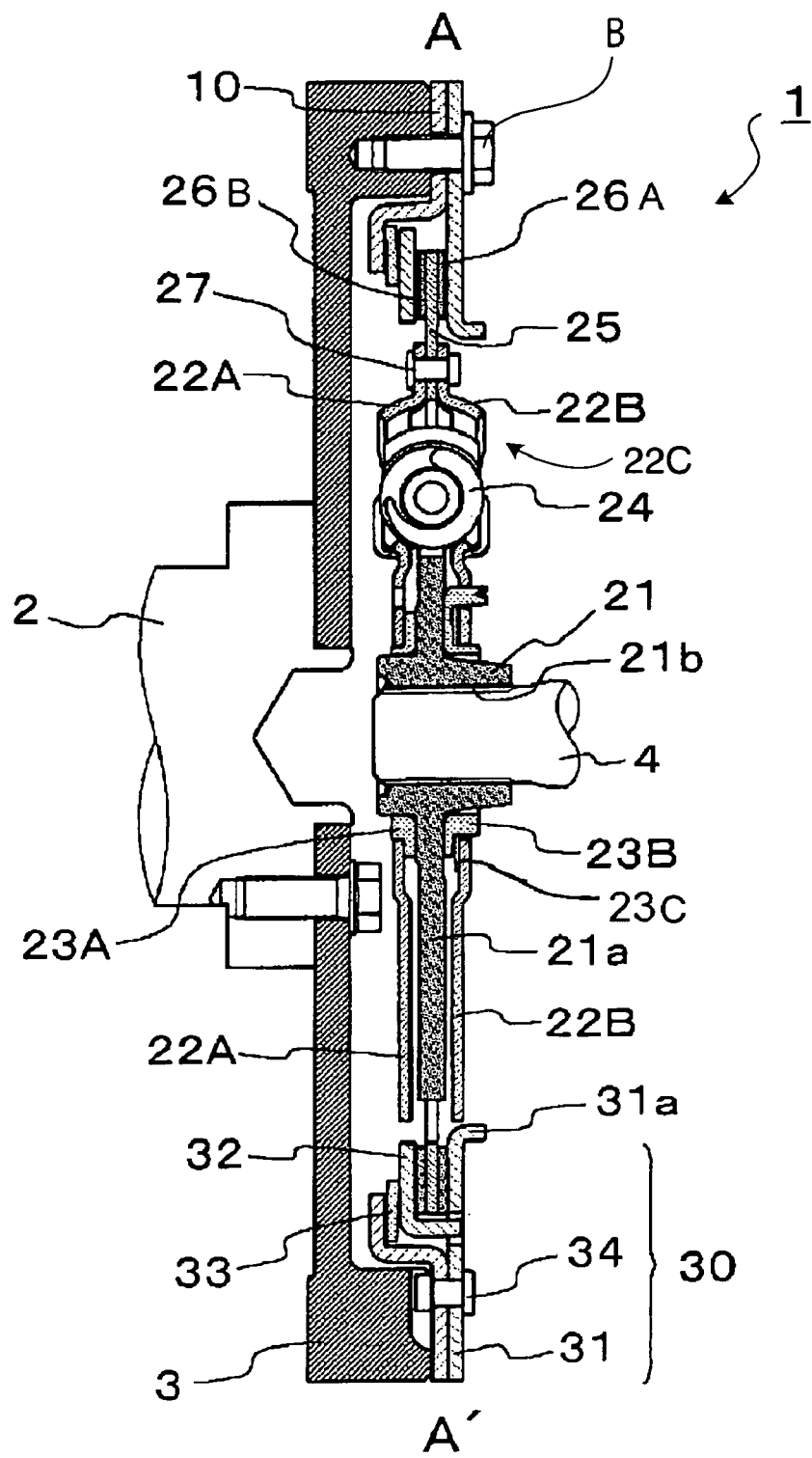
FIG. 2 is a sectional view of the torque fluctuation absorbing device taken along a line A-A' in FIG. 1.
Figure 3:
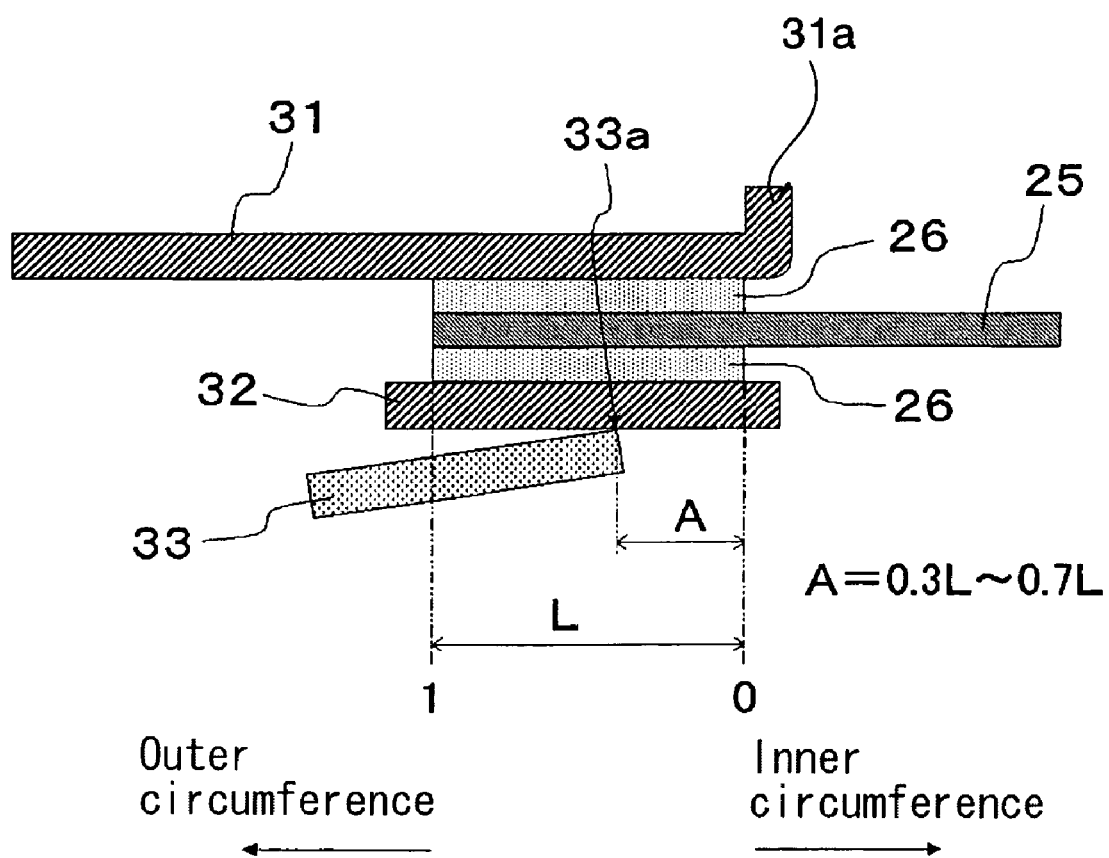
FIG. 3 is a partial sectional view showing a vicinity of a limiter portion illustrating a fulcrum of a coned disk spring in the torque fluctuation absorbing device according to the first embodiment of the present invention.

Embodiments of the present invention will be described hereinbelow in detail with reference to the accompanying drawings. FIG. 1 is a plane view with a part cutaway illustrating a torque fluctuation absorbing device according to a first embodiment of the present invention. FIG. 2 is a sectional view of the torque fluctuation absorbing device taken along a line A-A' in FIG. 1. FIG. 3 is a partial sectional view showing a vicinity of a limiter portion illustrating a fulcrum of a coned disk spring in the torque fluctuation absorbing device according to the first embodiment of the present invention. FIG. 4 is a partial sectional view showing a vicinity of the limiter portion illustrating surface pressure distribution of a second surface of the frictional members between a second plate and a frictional member in the torque fluctuation absorbing device according to the first embodiment of the present invention. The torque fluctuation absorbing device disposed between an engine and transmission for vehicles will be described hereinbelow.

As illustrated in FIGS. 1, 2, 3 and 4, a torque fluctuation absorbing device 1 includes a flywheel 3, a supporting member 10, a damping mechanism 20 and a limiter portion 30.

The supporting member 10 supports a coned disk spring 33 and rotates with the flywheel 3 connected with a drive shaft 2. The damping mechanism 20 is adjusted to absorb fluctuation of driving torque of the flywheel 3 fixed a driving shaft of the driving power source. When the fluctuating torque between the damping mechanism 20 and the flywheel 3 reaches a predetermined value (i.e., a limit torque value), the limiter portion 30 limits the torque to be transmitted from the support member 10 to a transmission input shaft (see FIG. 2).

The damping mechanism 20 includes a hub 21, two side plates 22A and 22B, thrust members 23A and 23B, a damper member 24, a disc 25, frictional members 26A and 26B, and rivets 27 which fix the side plates 22A and 22B.

The hub 21 is integrally provided with a flange portion 21a extending radially outwardly. The hub 21 is further provided with a spline portion 21b at an inner surface of a central bore thereof, which is in spline engagement with the transmission input shaft (see FIG. 2). The flange portion 21a and the spline portion 21b are composed integrally. There are at least one notched portion 21c defined at a radially outer side of the flange portion 21a (see FIG. 1). The notched portion 21c is composed so that an outer circumference surface side of spring seats 24a and 24b can be located radially outwardly than the outer circumference surface of the flange portion 21a. According to the first embodiment of the present invention, there are four notched portions 21c defined at the radially outer side of the flange portion 21a.

The side plate 22 includes a first side plate 22A and a second side plate 22B. As illustrated in FIG. 2, the first and second side plates 22A and 22B are oriented along both axial surfaces of the flange portion 21a to be substantially coaxial with the hub 21, respectively. The first and second side plates 22A and 22B rotate relative to the hub 21. Each of the fist and second side plates 22A and 22B has a penetrating hole at a radially outer portion thereof so as to be riveted with the disc 25 at the outer circumference portion by rivets 27 together. Each of the first and second side plates 22A and 22B has at least one window bore 22c for housing the damper member 24 therein. According to the first embodiment of the present invention, there are four window bores 22c for housing the damper members 24 therein, respectively.

The thrust members 23A and 23B are an approximately ring-shaped member disposed between an inner surface of the side plate 22 and an outer surface of the hub 21. The inner surface of the side plate 22 is in contact with the outer surface of the hub 21. The thrust member 23 includes a first thrust member 23A, which is disposed between the outer surface of the hub 21 and the first side plate 22A, a second thrust member 23B, which is disposed between the outer surface of the hub 21 and the second side plate 22B, and a coned disk spring 23c (i.e., biasing means). Therefore, a hysterresis torque is generated between the flange portion 21a of the hub 21 and the side plate 22B. The coned disk spring 23c is not limited to a coned disk spring type and any other spring can be used.

The damper member 24 includes a coil spring and is housed in the notched portion 21c of the hub 21 and the window bore 22c of the side plate 22. In this case, four damper members 24 are used. There is a case that the two damper members are used. Each damper members is supported by a pair of spring seats 24a and 24b, and is housed in the notched portion 21c and the window bores 22c (see FIG. 1).

The disc 25 is an approximately annular-shaped disc and extends in a more radially outward direction than an outer circumference of the side plate 22. A vicinity of an inner circumference of the disc 25 has been held by the side plate 22 and includes the penetrating hole for connecting the disc 25 with the side plate 22. The frictional members 26A and 26B of approximately annular-shaped are fixed at both axial surfaces of the disc 25, as illustrated in FIG. 2.

According to the first embodiment of the present invention, the frictional members 26A and 26B are fixed at both surfaces of the disc 25 with an adhesive. A first surface of the frictional member 26 contacts with a first plate 31. A second surface of the frictional members 26 contacts with a second plate 32. A frictional surface of the one frictional member 26 (illustrated in FIG. 2) is held by the first plate 31, while a frictional surface of the other frictional member 26 (illustrated in FIG. 2) is held by the second plate 32.

The rivets 27 are inserted in the penetrating hole of the disc 25 and the side plate 22. The rivets 27 connect the disc 25 with the side plate 22.

The limiter portion 30 includes the first plate 31, the second plate 32, the coned disk spring 33 and rivets 34. The limiter portion 30 can be interpreted to also include the frictional members 26A and 26B. As illustrated in FIG. 2, the first plate 31 is fixed to the flywheel 3 by a plurality of bolts B via the supporting member 10 and is frictionally engaged with the frictional member 26A of the damper mechanism 20 from the opposite side of the supporting member 10. Details of the first plate 31 will be illustrated later. The second plate 32 is frictionally engaged with the frictional member 26B of the damper mechanism 20 having the second phase from the side of the supporting member 10. The coned disk spring 33 is oriented between the supporting member 10 and the second plate 32 and biases the second plate 32 in a right direction as viewed in FIG. 2, i.e., in a direction for keeping the second plate 32 away from the supporting member 10. Therefore, the frictional members 26A and 26B of the damping mechanism 20 can be held by the first and second plates 31 and 32 such that the supporting member 10 and the damping mechanism 20 can be maintained at a frictionally engaged condition. Details of the coned disk spring 33 will be illustrated later. The rivets 34 fix the supporting member 10 and the first plate 31.

The first plate 31 includes a reinforcement portion 31a, which reinforces the rigidity of the first plate 31. The reinforcement portion 31a is integrally formed with the first plate so as to form a single unitary member. The reinforcement portion 31a is a rib of an approximately ring-shaped formed at an inner circumference edge of the first plate 31. This rib projects on the opposite side of the flywheel (i.e., the side of the transmission input shaft 4). The rigidity of the first plate 31 is improved by disposing the rib. Therefore, the variation in the deflection at a riveting portion and other portions is prevented.

Figure 4A:
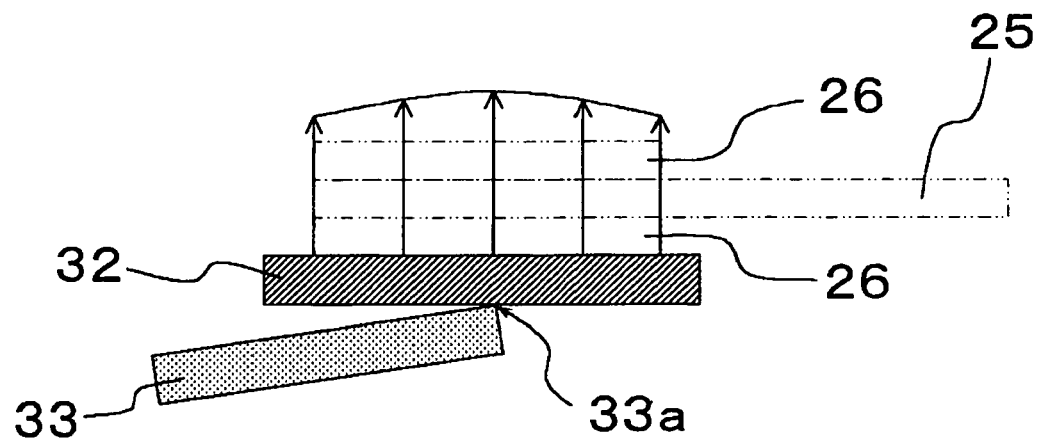
FIG. 4 is a partial sectional view showing a vicinity of the limiter portion illustrating surface pressure distribution of a second surface of frictional members between a second plate and a frictional member in the torque fluctuation absorbing device according to the first embodiment of the present invention.
Figure 4B:
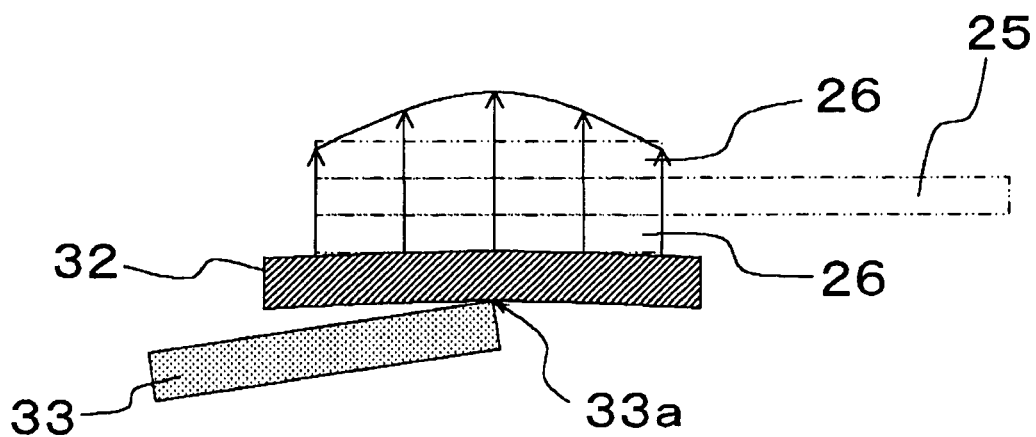

A component of a reinforcement portion will be illustrated with FIG. 3. The fulcrum 33a of the coned disk spring is located within a region on the surface of the second plate 32 opposite to the surface abutting on the second surface of the frictional member 26 and wherein the region is defined to be no fewer than 0.3L nor more than 0.7L when the inner circumference portion of the frictional surface between the second plate and the second surface of the frictional member is 0L and an outer circumference of the frictional surface therebetween is set to be 1L. That is, when the width of the inner circumference and the outer circumference of the second surface of the frictional member wherein the second plate 32 and the frictional member 26B abut is set as L, the width A within the region of the overside of the second plate 32 corresponding to the second surface of the frictional members between the inner circumference and the fulcrum of the coned disk spring indicates value of 0.3L to 0.7L (see FIG. 3). It is preferable that the width A is no fewer than 0.4L nor more than 0.6L. Furthermore, it is more preferable that the width A is no fewer than 0.45L nor more than 0.55L. FIG. 4 shows a surface pressure distribution wherein the width A is within 0.3L to 0.7L. FIG. 4A shows the case which uses the second plate 32 wherein the rigidity is high. FIG. 4B shows the case which uses the second plate 32 wherein the rigidity is not high. In any case, it can be possible that a bearing pressure becomes high at the inner circumference edge or at the outer circumference edge of the second surface of the frictional members.

As described above, according to the first embodiment of the present invention, the frictional members 26A and 26B are held between the first plate 31 and the second plate 32. Alternatively, the frictional members can be disposed between a portion of the supporting member 10 and the second plate 32. In this case, when the fluctuating torque reaches the predetermined value (i.e., limit torque value), the frictional members slip relative to the supporting member 10.

Next, following explanation will be given for explaining an operation of the torque fluctuation absorbing device 1 according to the above-described components.

When the engine is driven, the supporting member 10 rotates with the flywheel 3 in response to a driving force of the drive shaft 2 from the engine. While the fluctuating torque is smaller than the limit torque value, a rotational torque is transmitted to the disc 25 of the damping mechanism 20 and the side plate 22 via the limiter portion 30, wherein the damping mechanism 20 rotates. The rotational torque of the side plate 22 is transmitted to the hub 21 from the flange portion 21a via the damper member 24 and the thrust member 23, wherein the hub 21 starts rotating. In this case, the damper member 24 is elastically compressed in response to the amount of the fluctuating torque. As described above, the driving force of the drive shaft 2 is transmitted to the transmission input shaft 4 via the damping mechanism 20.

In the torque fluctuation absorbing device 1 functioning as described above, when the fluctuating torque between the damping mechanism 20 and the flywheel 3 reaches the limit torque value in response to increase of the driving torque from the engine, the frictional members 26 starts slipping. Therefore, a torque over the limit torque value can be prevented from being transmitted between the side plate 22 and the hub 21.

As described above, the surface pressure distribution of the frictional surface, in particular the region of the inner circumference side in the frictional surface, becomes uniform and the fluctuation of the limit torque value is prevented.

Figure 5:
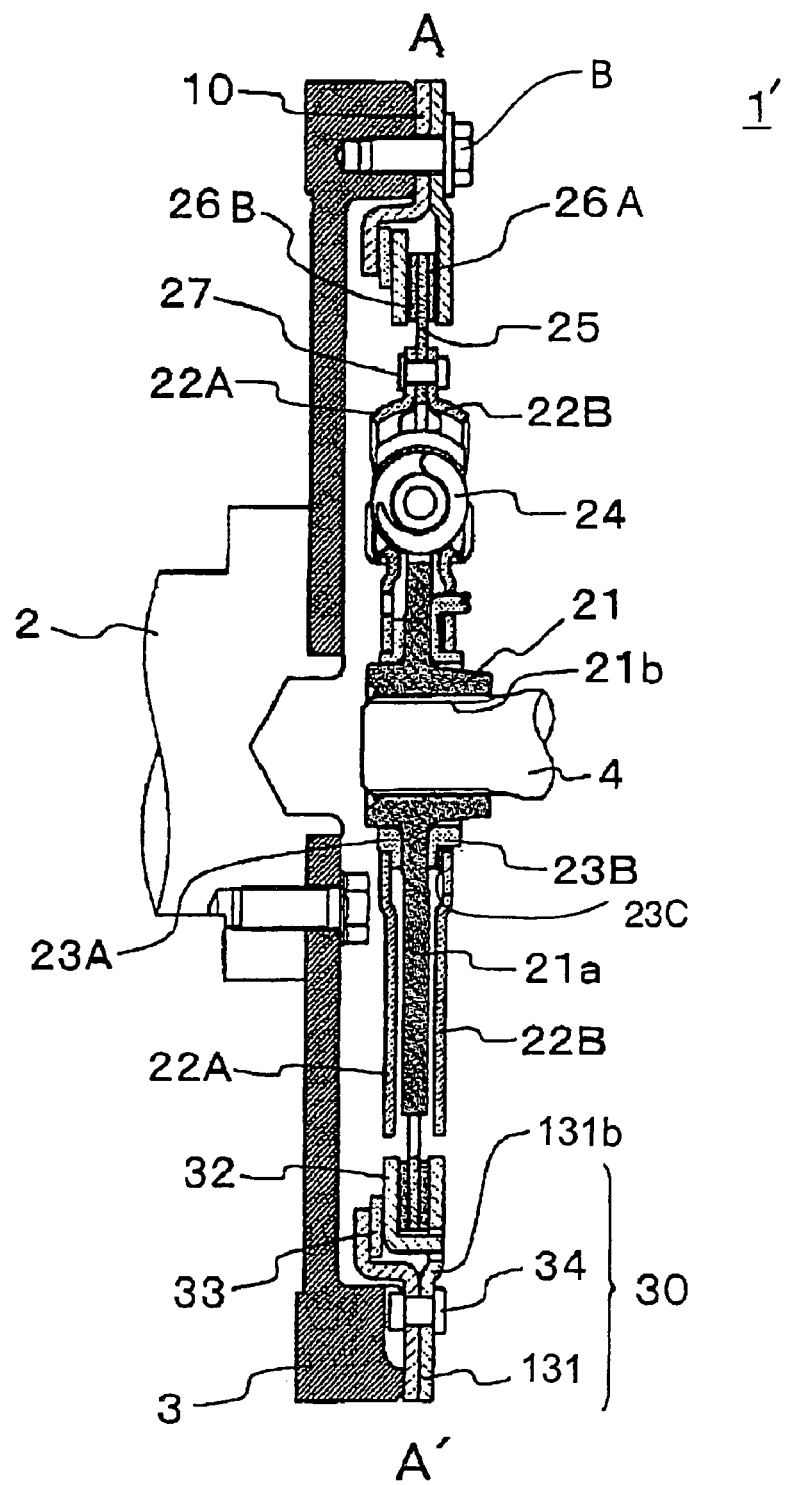
FIG. 5 is a sectional view of the torque fluctuation absorbing device according to a second embodiment of the present invention.
Figure 6:
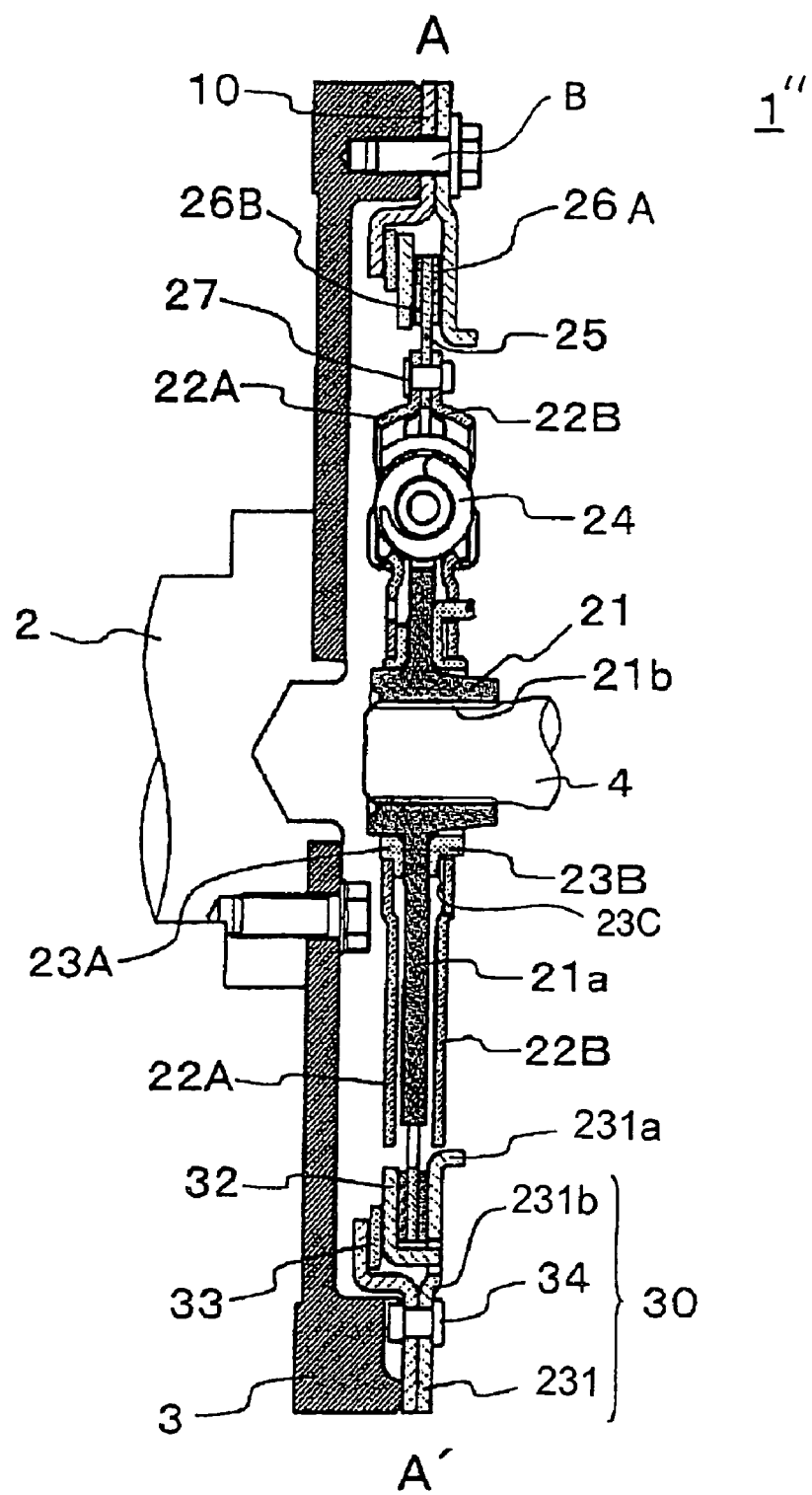
FIG. 6 is a sectional view of the torque fluctuation absorbing device according to a third embodiment of the present invention.

Next, following explanation will be given for explaining some of the effects according to the second embodiment of the present invention with the attached drawings. FIG. 5 is a sectional view of the torque fluctuation absorbing device according to a second embodiment of the present invention. That is, the sectional view corresponds to the line A-A' in FIG. 1.

In the torque fluctuation absorbing device 1' according to the second embodiment of the present invention, there is a difference in a component of the first plate. The other components of the torque fluctuation absorbing device 1 according to the second embodiments of the present invention, have the same construction as the ones according to the first embodiment and accordingly a detailed description thereof will be omitted hereinbelow.

The first plate 131 includes a reinforcement portion 131b, which reinforces the rigidity of the first plate 131. The reinforcement portion 131b is integrally formed with the first plate so as to form a single unitary member. The reinforcement portion 131b is a stepped portion formed in the region between the outer circumference of the frictional surface in the first plate and the rivets 34 (i.e., the fixation members). The stepped portion is also formed in the region between the outer circumference of the frictional surface of the first plate and the bolts B as shown in FIG. 5. As also shown in FIG. 5, the stepped portion is formed so that the opposite surfaces of the first plate are stepped outwardly away from the flywheel. The rigidity of the first plate 131 becomes high by disposing the stepped portion and the variation in the deflection at the riveting portion and other portions is prevented. Therefore, the surface pressure distribution of the frictional surface, in particular the region of the inner circumference portion in the friction surface, becomes inconstant and the limit torque value can be stable according to the second embodiment.

The torque fluctuation absorbing device 1″ according to the third embodiment of the present invention is a combination of the component of the first plate in the torque fluctuation absorbing device 1, 1' according to the first embodiment and the second embodiment.

The first plate 31 includes reinforcement portions 231a and 231b, which reinforce the rigidity of the first plate 231. The reinforcement portion 231a is an approximately ring-shaped rib formed in the inner circumference edge of the first plate 231. The approximately ring-shaped rib projects on the opposite side of the flywheel (i.e., the side of the transmission input shaft 4). The reinforcement portion 231b is the stepped portion formed in the region between the outer circumference of the frictional surface in the first plate 231 and the rivets 34 (i.e., the fixation members). The rigidity of the first plate 231 becomes high by disposing the rib 231a and the stepped portion 231b. The variation in the deflection at a vicinity of riveting portion and other portions is prevented. Therefore, the surface pressure distribution of the frictional surface, in particular the region of the inner circumference in the frictional surface, is uniformized and the fluctuation of the limit torque value is prevented according to the third embodiment.

Figure 7:
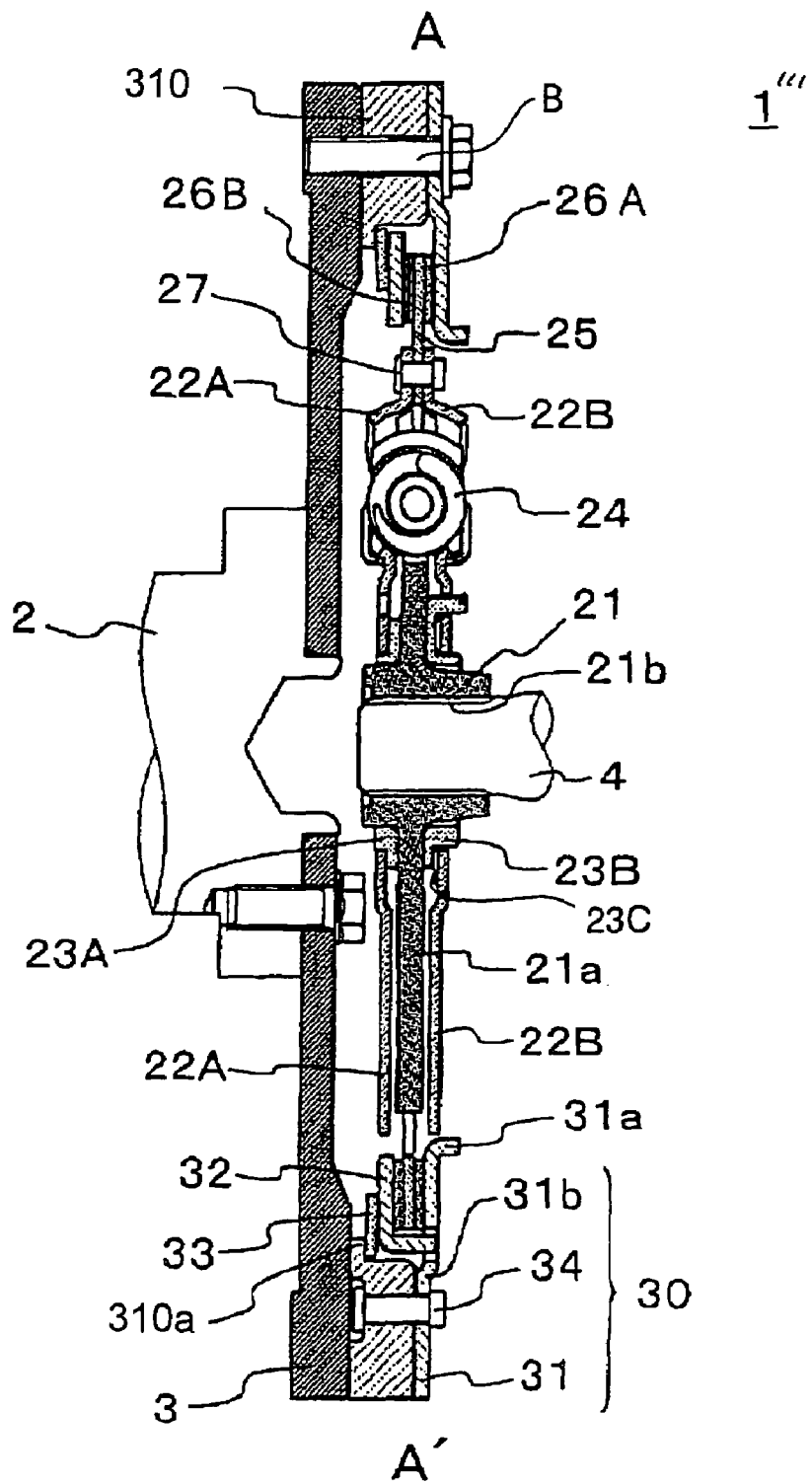
FIG. 7 is a sectional view of the torque fluctuation absorbing device according to a fourth embodiment of the present invention.
Figure 9:
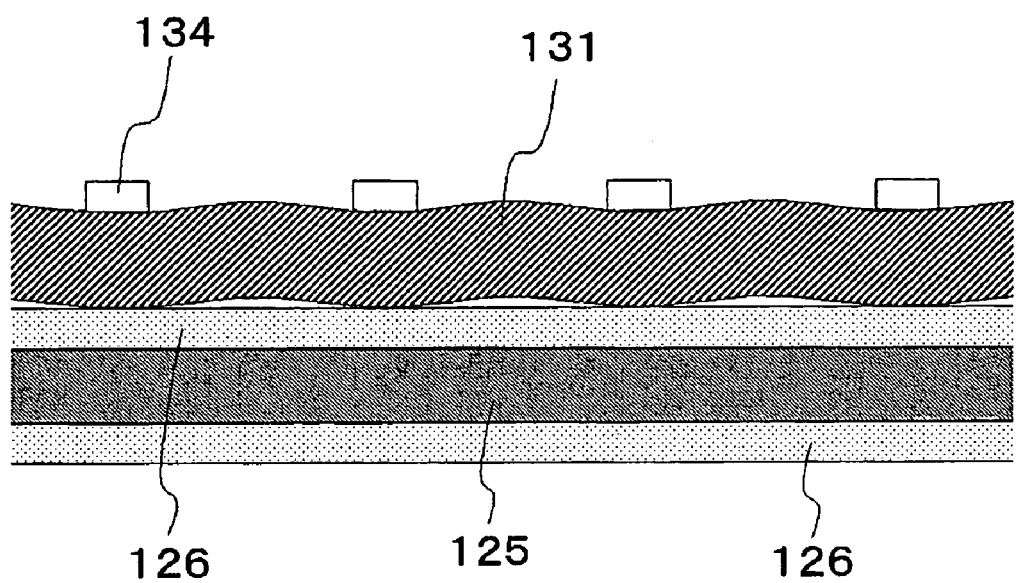
FIG. 9 is a partial sectional view in a vicinity of the limiter portion illustrating the conventional torque fluctuation absorbing device.

Next, following explanation will be given for explaining some of the effects according to the fourth embodiment of the present invention with the attached drawings. FIG. 7 is a sectional view of the torque fluctuation absorbing device according to a forth embodiment of the present invention.

In the torque fluctuation absorbing device 1′″ according to the fourth embodiment of the present invention, there is a difference in a supporting member and a component of the first plate. The other components of the torque fluctuation absorbing device 1′″ according to the fourth embodiments of the present invention, posses the same construction as the ones according to the third embodiment and so a detailed description thereof will be omitted hereinbelow.

The supporting member 310 is disposed at the inner circumference side. The supporting member 310 is a ring-shaped member which includes a flange member 10a abutted on the surface of the flywheel 3. The coned disk spring 33 is supported by the flange member 310a of the supporting member. A deformation of the supporting member 310 is prevented by setting as the ring-shaped member which includes the flange member 310a. The supporting member 310 can be also applied to the torque fluctuation absorbing device according to the first embodiment and the second embodiment.

What is claimed is:

1. A torque fluctuation absorbing device comprising:
a damping mechanism connected with an input shaft of a transmission and having an approximately annular-shaped frictional member, which is fixed to both surfaces of a disc disposed at an outer peripheral portion of the disc;
a flywheel rotated by a driving power source and transmitting driving force from the driving power source to the input shaft through the damping mechanism in order to rotate the input shaft;
a first plate rotated with the flywheel and abutting on a first surface of the frictional member;
a second plate abutting on a second surface of the frictional member;
a coned disk spring for biasing the second plate against the frictional member;
a supporting member rotated with the first plate and supporting the coned disk spring; and
a plurality of fixation members for fixing the first plate with the supporting member, wherein the first plate includes a reinforcement portion which reinforces rigidity of the first plate at an outer circumference portion located radially outwardly relative to the frictional member;
wherein the reinforcement portion is a stepped portion in which opposite surfaces of the first plate are stepped outwardly away from the flywheel, the stepped portion being formed at a region between an outer circumference of the frictional surface of the first plate and the fixation members.

2. A torque fluctuation absorbing device according to claim 1, further comprising another reinforcement portion formed at the first plate as an approximately ring-shaped rib.

3. A torque fluctuation absorbing device according to claim 1, further comprising another reinforcement portion formed at the first plate as a rib which projects in a direction opposite to the flywheel.

4. A torque fluctuation absorbing device according to claim 1, wherein the supporting member is formed as a ring-shaped member which includes a flange member which abuts on an outer surface of the flywheel and the coned disk spring is supported by the flange member.

5. The torque fluctuation absorption device according to claim 1, wherein the reinforcement portion is integrally formed with the first plate so as to form a single unitary member.

6. A torque fluctuation absorbing device comprising:
a damping mechanism connected with an input shaft of a transmission and having an approximately annular-shaped frictional member, which is fixed to both surfaces of a disc disposed at an outer peripheral portion of the disc;
a flywheel for transmitting driving force from a driving power source;
a first plate rotated with the flywheel and abutting on a first surface of the frictional member;
a second plate abutting on a second surface of the frictional member;
a coned disk spring for biasing the second plate against the frictional member;
a supporting member rotated with the first plate and supporting the coned disk spring; and
a plurality of fixation members for fixing the first plate with the supporting member, wherein the first plate includes a reinforcement portion which reinforces rigidity of the first plate at an outer circumference portion located radially outwardly relative to the frictional member;
wherein the reinforcement portion is a stepped portion in which opposite surfaces of the first plate are stepped outwardly away from the flywheel, the stepped portion formed at a region between an outer circumference of the frictional surface of the first plate and the fixation members;
wherein a frictional surface at which the second plate abuts on the second surface of the frictional member possesses a length L measured from an inner circumference of the frictional surface to an outer circumference of the frictional surface, and wherein a distance between a fulcrum of the cone spring and the inner circumference of the frictional surface is not less than 0.3L and not greater than 0.7L.

7. A torque fluctuation absorbing device comprising:
a damping mechanism connected with an input shaft of a transmission and having an approximately annular-shaped frictional member, which is fixed to both surfaces of a disc disposed at an outer peripheral portion of the disc;

a flywheel rotated by a driving force from the driving power source to the input shaft through the damping mechanism in order to rotate the input shaft;

a first plate rotated with the flywheel and having a first surface abutting on a first surface of the frictional member, the first plate being fixed to the flywheel by bolts, the first plate possessing a second surface facing in a direction opposite the first surface of the first plate;

a second plate abutting on a second surface of the frictional member;

a coned disk spring for biasing the second plate against the frictional member;

a supporting member rotated with the first plate and supporting the coned disk spring; and a plurality of fixation members for fixing the first plate with the supporting member, wherein the first plate includes a reinforcement portion which reinforces rigidity of the first plate at an outer circumference portion located radially outwardly relative to the frictional member, wherein the reinforcement portion is a stepped portion in which both the first and second surfaces of the first plate are stepped outwardly away from the flywheel, the stepped portion being formed at a region between an outer circumference of the frictional surface of the first plate and the bolts.

8. A torque fluctuation absorbing device according to claim 7, wherein a frictional surface at which the second plate abuts on the second surface of the frictional member possesses a length L measured from an inner circumference of the frictional surface to an outer circumference of the frictional surface, and wherein a distance between a fulcrum of the cone spring and the inner circumference of the frictional surface is not less than 0.3L and not greater than 0.7L.

9. A torque fluctuation absorbing device according to claim 8, further comprising another reinforcement portion formed at the first plate as an approximately ring-shaped rib.

10. A torque fluctuation absorbing device according to claim 8, further comprising another reinforcement portion formed at the first plate as a rib which projects in a direction opposite to the flywheel.

11. A torque fluctuation absorbing device according to claim 8, wherein the supporting member is formed as a ring-shaped member which includes a flange member which abuts on an outer surface of the flywheel and the coned disk spring is supported by the flange member.

12. The torque fluctuation absorption device according to claim 8, wherein the reinforcement portion is integrally formed with the first plate so as to form a single unitary member.

13. A torque fluctuation absorbing device according to claim 7, further comprising another reinforcement portion formed at the first plate as an approximately ring-shaped rib.

14. A torque fluctuation absorbing device according to claim 7, further comprising another reinforcement portion formed at the first plate as a rib which projects in a direction opposite to the flywheel.

15. A torque fluctuation absorbing device according to claim 7, wherein the supporting member is formed as a ring-shaped member which includes a flange member which abuts on an outer surface of the flywheel and the coned disk spring is supported by the flange member.

16. The torque fluctuation absorption device according to claim 7, wherein the reinforcement portion is integrally formed with the first plate so as to form a single unitary member.

* * * * *